...

United States Patent [19]
Zanca

[11] 3,844,698

[45] Oct. 29, 1974

[54] MEANS FOR FORMING A HOLE IN THE ARTICLE DURING BLOW MOLDING

[76] Inventor: Joseph Zanca, 1662-62nd St., Brooklyn, N.Y. 11204

[22] Filed: Aug. 2, 1972

[21] Appl. No.: 277,194

[52] U.S. Cl. .................. 425/155, 425/DIG. 204, 425/DIG. 231, 425/DIG. 214, 425/DIG. 37
[51] Int. Cl............................................ B29d 23/03
[58] Field of Search.. 425/249, DIG. 214, DIG. 204, 425/DIG. 37, 155, 135, DIG. 231, 387 B

[56] References Cited
UNITED STATES PATENTS

| | | | |
|---|---|---|---|
| 2,541,249 | 2/1951 | Hobson | 425/DIG. 214 |
| 3,109,203 | 11/1963 | Moormann | 425/DIG. 214 |
| 3,488,801 | 1/1970 | Havely | 425/DIG. 204 |
| 3,538,211 | 11/1970 | Adomaitis | 425/DIG. 204 |
| 3,649,728 | 3/1972 | Honsho et al | 425/249 X |
| 3,679,785 | 7/1972 | Dike | 425/DIG. 204 |
| 3,737,275 | 6/1973 | Kontz | 425/DIG. 204 |

*Primary Examiner*—Richard B. Lazarus
*Attorney, Agent, or Firm*—Hall & Myers

[57] ABSTRACT

A mold for blow-molding a hollow plastic article from a hot, malleable parison is provided with means for forming smooth, nonfrayed holes in the plastic article during the blow-molding operation. The means for forming the holes are located in the walls of the mold and comprise a reciprocating punch or piercing means which when reciprocated in one direction are caused to enter the mold cavity and pierce a wall of the blown hollow plastic article. The reciprocating punch or piercing means include a cylinder means located in the wall of the mold and a piston therein. The piston is reciprocated by air actuated valves so as to drive needle-like piercing means into the cavity, and withdraw them from the cavity prior to the opening of the mold. Also provided is a method for forming a hole in the wall of a blow-molded plastic article formed in a blow-molding cavity from a hollow malleable parison and during the blow-molding operation by applying pressure internally of the parison to force the parison against the walls of the mold cavity. Thereafter, a prescribed period of time is allowed to elapse for the parison to become rigid and form an article. During this time, and prior to the time that the parison becomes rigid, a reciprocating piercing means is forced inwardly from a location external to the cavity into hole-forming engagement with the walls of the plastic article now contacting the cavity walls. This reciprocating piercing means is thereafter caused to be withdrawn, usually after the parison becomes rigid, but always before the opening of the mold.

9 Claims, 10 Drawing Figures

PATENTED OCT 29 1974      3,844,698

49 TIMER AND AIR ACTUATING MEANS

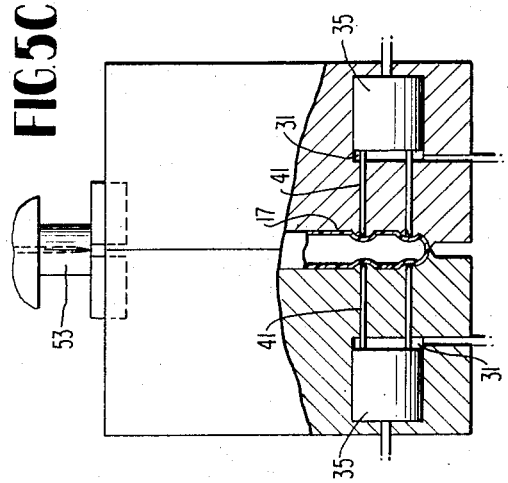
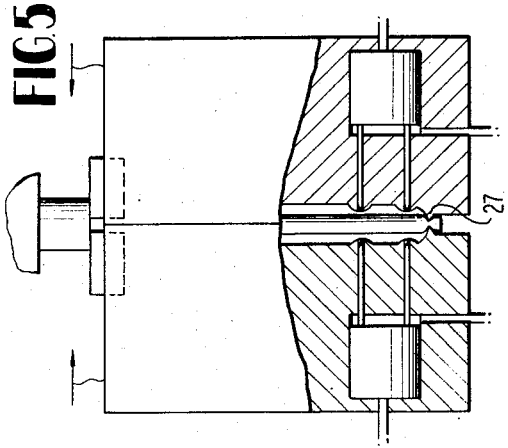
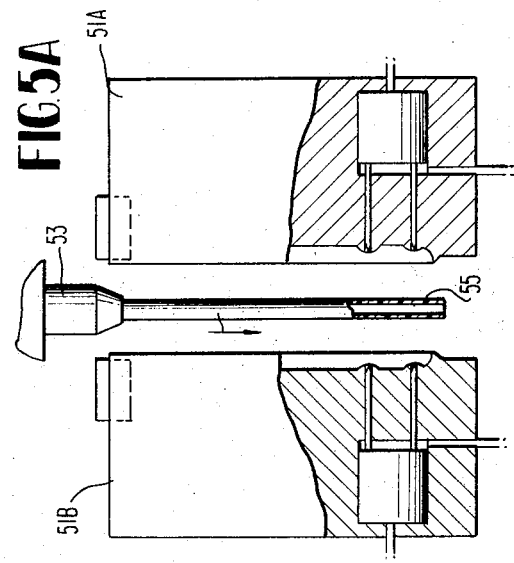
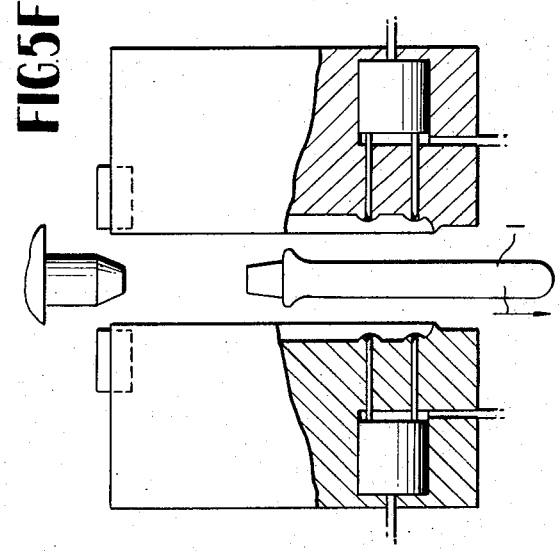
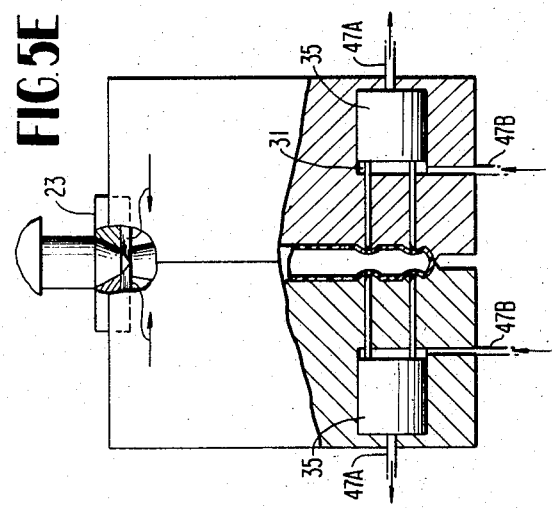
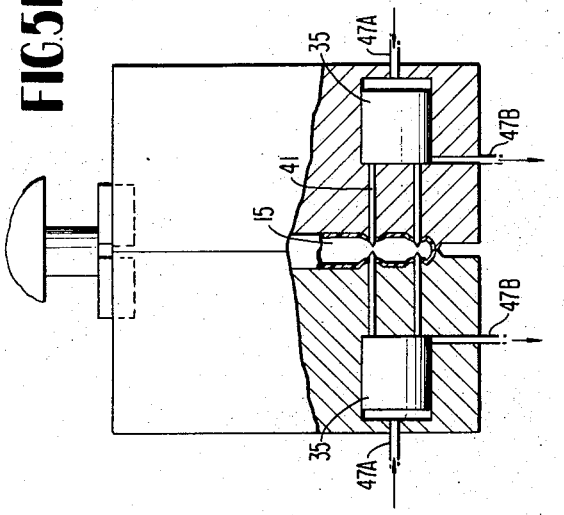

MEANS FOR FORMING A HOLE IN THE ARTICLE DURING BLOW MOLDING

This invention relates to molds and methods for forming holes in blow-molded plastic articles during the blow-molding operation. More particularly, this invention relates to molds and methods for forming holes in the cannula of plastic disposable douche devices during the blow-molding operation, the resulting hole being substantially without fray or other plastic minutia that might cause contamination of the douche solution as it is dispensed from the device.

The art of blow-molding a plastic article from a hollow parison by forcing pressure internally of the parison while it is in its malleable state and thus forcing the parison outwardly against the walls of the cavity is a well-developed, and highly sophisticated art. While certain techniques have been developed for forming holes in the resulting plastic article, generally speaking such techniques require relatively complex equipment, are applicable only on certain special types of articles, or they have required that the article first be removed from the mold before a hole can be formed by drilling or the like.

One example of a technique which does not require that the article be first removed from the mold before a hole can be formed is disclosed in U.S. Pat. No. 3,391,424. In this patent there is disclosed an apparatus for manufacturing perforated tubing which includes a cutting means for scoring the internal ridges of a corrugated tube as it progresses through a continuously moving belt mold and thus is limited to those instances where corrugated tubing is being produced. This of course does not solve the problem of forming a hole in a blow molded device which does not have internal ridges to score or which is static in the mold and not being transported across the mold by continuous belt means. In addition the device of this patent further requires rather careful and complex alignment of the various cutting or scoring blades which are located internally of the mold cavity.

While the problem of forming at least one hole in the wall of a blow-molded article is experienced throughout the blow molding industry, it becomes particularly troublesome in the disposable douche art. Disposable douches, in this respect, are well known in the art as represented for example by U.S. Pat. Nos. 2,664,893; 3,057,352; 3,144,866; 3,495,706; and 3,626,939. Generally speaking, these disposable douches are comprised in part of a blow-molded flexible bellows portion which contains the douche solution. The bellows, in turn, is connected by a neck portion to an elongated tubular portion known as a cannula which is inserted into the female body such that upon squeezing of the bellows, the douche solution is transported from the bellows into the elongated tubular cannula and outwardly throughout a plurality of holes in the cannula and into the cavity of the body to be cleansed.

In the formation of these disposable douche devices the bellows portion is usually separately blow-molded from the cannula portion. Heretofore, the usual practice was to form the cannula in a typical blow-molding operation wherein a parison is extruded downwardly into a blow-mold cavity. The cavity is then closed, pinching off the parison which is then expanded by internal pressure into contact with the cavity walls and allowed to becomd rigid therein (usually by water-cooling the mold). Thereafter, the mold is opened, and the cannula is removed from the mold from whence it goes to a hole punching operation. This hole punching operation has been characteristically carried out by either drilling the holes in the cannula in a separate step, or piercing the cannula, in a separate step, with a hot wire. None of these techniques has proved completely satisfactory because all of them bear the difficult problem of fraying the circumference of the hole and thereby presenting small, tiny minutia of plastic which, upon dispensing of the douche solution, become a potential contaminant to the delicate portions of the body.

It is therefore clear from the above that not only does there exist a definite need in the blow molding art for a mold and technique which forms a hole in an article during the blow molding operation and which is readily adaptable to all types of blow-molded articles but it is also clear that there exists a particularly prevalent need for such a mold and technique in the cannula art.

It is the purpose of this invention to fulfill these needs in the art as well as other needs which will become more apparent to the skilled artisan once given the following detailed disclosure.

Generally speaking, this invention fulfills the above described and other needs in the art by providing in a mold for blow-molding a hollow plastic article comprising mold walls having located therein a cavity portion of the dimensions of the desired article, the cavity portion being defined by cavity walls which terminate in closing fashion within the mold walls and which define an orifice in the mold walls through which a plastic parison may be inserted, the improvement which comprises, a reciprocating punch means communicating through the mold walls with the cavity to an extend sufficient to form at least one hole in the wall of the hollow plastic article during the blow-molding operation, and means for reciprocating the punch means.

In a particularly preferred form of this invention the mold cavity is designed to form an elongated tubular cannula useful in a disposable douche device wherein at least two holes are formed by the punch means in substantially the longitudinal end (i.e. lower half end) of the cannula poftion.

A particularly preferred cannula formed by the mold and techniques of this invention is described in my co-pending application entitled "Disposable Douche" filed concurrently herewith. The disclosure of this application is incorporated herein by reference. Generally speaking, this copending application discloses a unique disposable douche comprising (1) a cannula having a head end provided with ports for discharging of a fluid into a use area and a bore extending along the axis of the cannula from the ports to the opposite end of the cannula and (2) a collapsible, flexible container (i.e. bellows) adapted to contain a fluid and having an open mouth section through which a fluid in the container may be expelled through the cannula. The douche device also includes means for connecting the cannula to the collapsible, flexible container, said means consisting of a tapered section at the end of the cannula opposite said ports and an open mouth tapered section on the container wherein said cannula and said container may be assembled for use by simply bringing the two tapered sections together and exerting pressure along the axis of the cannula to cause the taper at the end of the cannula to slide into the open mouth tapered section of the container.

In another preferred form of this invention, the reciprocating punch means is comprised of a cylinder in which there is located a reciprocating piston which in turn is connected to piercing means such as needle-like objects which communicate with the mold cavity (e.g. preferably designed to form a tpaered end cannula as disclosed in the aforesaid copending application) through a tubular orifice means extending between the cylinder and the cavity. In this embodiment, the piercing means are of sufficient size and so located in the tubular orifice means such that when the piston is reciprocated in one direction (inwardly toward the mold cavity through the mold walls) the piercing means extend sufficiently far into the cavity to form a hole in the wall of the plastic article being blow-molded therein, and, when the piston is reciprocated in the other direction (away from the cavity) the piercing means are withdrawn out of communication with said cavity such that the article so formed and now containing at least one smooth, nonfrayed hole, may be readily dispensed from the mold.

In this way, the subject invention provides a unique and yet simple mold for forming a hole in a blow-molded article generally, and preferably in a cannula. The hole is extremely smooth and substantially free of frayed plastic minutia which, for example, could cause contamination when a fluid or other material is dispensed from the molded article with force.

In like manner, this invention also provides the art with a unique and yet simple method of forming such a hole. Such a method as contemplated by this invention generally comprises lowering a malleable parison into a mold cavity, closing the mold, applying pressure internally of the parison thereby forcing the walls of the malleable parison into engagement with the walls of the mold cavity, reciprocating a piercing means inwardly from a location external to the cavity into hole forming engagement with the walls of the said plastic article at about the time the walls are forced into engagement with the walls of the cavity, and while said parison is still malleable, waiting a prescribed period of time for the walls of the parison to become rigid and form the article, and during or after said prescribed period but before opening of the mold, reciprocating outwardly the piercing means beyond the cavity walls, thereby to form a hole in the article, whereinafter the resulting article is removed from the mold by opening the mold.

In a particularly preferred method according to this invention, the above-described piercing step is accomplished by a timer and air-actuated means which causes the piercing to take place just after the malleable parison walls contact the cavity walls. Then, the piercing means (e.g. needle-like means) are allowed to remain within the pierced holes for a sufficient period of time to allow the wall around the hole to become sufficiently rigid to maintain the shape of the hole without the presence of the piercing means and then, the timer means actuates a reciprocation of the piercing means out of contact with the plastic article, thereby to form a hole in the side of the device which has substantially no minutia of plastic around its circumference.

This invention will now be described with reference to certain particular preferred embodiments and with reference to the accompanying drawings wherein.

Figure 3:
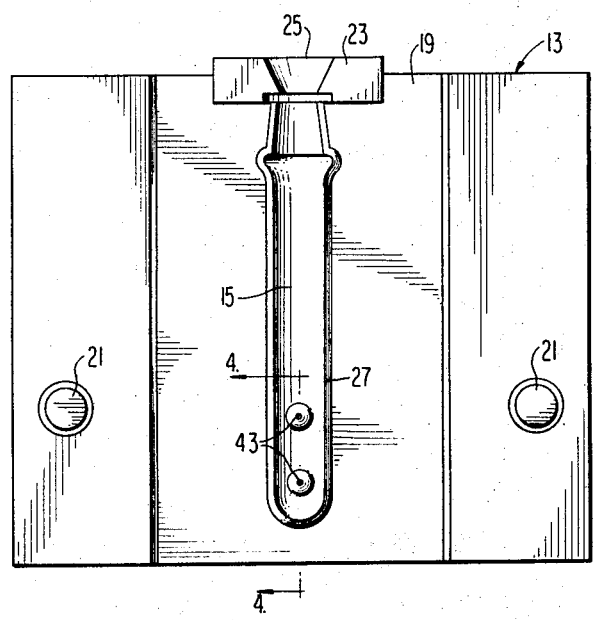
FIG. 3 is a side plan view of one half of a mold in accordance with this invention.
Figure 4:
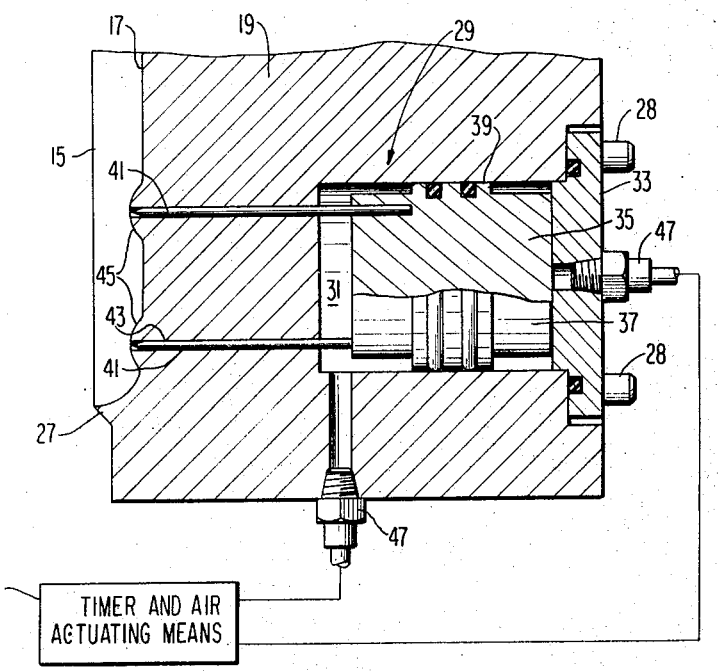
FIG. 4 is a partial, sectional view taken along line 4—4 of FIG. 3 illustrating a preferred piston-cylinder piercing means, air-actuating means and timer means in accordance with this invention.

FIGS. 5A–F are partially sectionalized views showing the mold illustrated in FIGS. 3–4 in various stages of operation in accordance with this invention.

Figure 1:
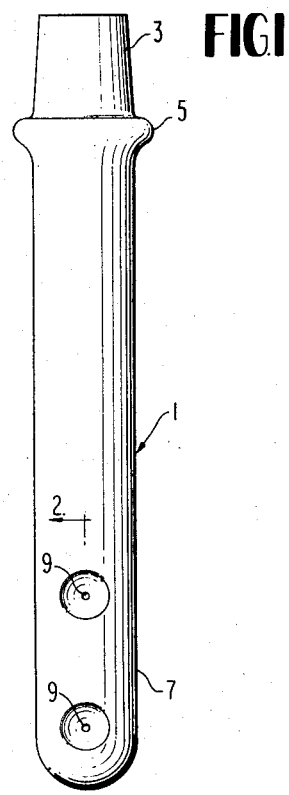
FIG. 1 is a cannula designed in accordance with my aforementioned copending application, the holes therein being formed in accordance with this invention.
Figure 2:
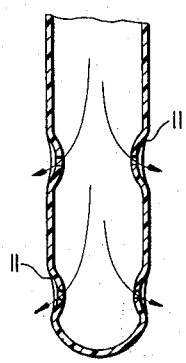
FIG. 2 is a partial, side sectional view taken along lines 2—2 of FIG. 1.

Referring now to FIG. 1, there is illustrated a hollow cannula in accordance with the teachings of my aforementioned copending application. Cannula 1 is generally formed of a tapered male section 3, a stop mechanism 5 and an elongated tubular portion 7. As stated above, cannula 1 is inserted into a container or bellows (not shown) as disclosed in my aforementioned copending application by inserting male tapered portion 3 into an outwardly tapered female section built into the container. Stop mechanism 5 assures both a tight fit and proper depth of insertion into the female taper. Elongated and hollow tubular portion 7 of cannula 1 is then inserted into the body area to be cleansed, in accordance with conventional techniques. The bellows which contains the douche solution is squeezed and the cleansing douche liquid is dispensed through hollow tubular portion 7 and outwardly through holes 9 (as shown by the arrows in FIG. 2) formed therein in accordance with the techniques of this invention. In a particularly preferred embodiment, as best illustrated in FIG. 2, the holes so formed in accordance with this invention, are countersunk as shown at 11. This countersink 11 has been found to be particularly useful in that it provides a smoother outer surface of cannula 1 for ease of insertion.

Referring now to FIGS. 3 and 4, there is illustrated a particularly preferred mold for forming cannula 1. Mold 13 is comprised of a cavity 15 defined by cavity walls 17 which are in fact the edges of mold walls 19. in the half mold shown in FIG. 3, there are further provided, male members 21 which are outwardly extending connecting and aligning means which align with corresponding female members in the other half of the mold when the mold is closed during the blow-molding operation.

Mold 13 also includes an entrance and trimming mechanism 23 having located therein an orifice 25 through which a hot malleable parison, preferably from an extruder tube, is presented to the mold. Then, in order that this parison may be pinched off, there is provided, on each half of the mold, an outwardly extending circumferential ridge 27 in accordance with conventional techniques. Also included in mold 13, are water conduits 28 through which water is optionally circulated for cooling the mold.

FIG. 4 illustrates a preferred form of the unique punch means provided in a mold in accordance with this invention. As generally illustrated in this figure, there is provided a punch means or mechanism 29 comprised of a cylinder 31 within the wall of the mold and closed at one end by a sealing means 33. Located within the mold is reciprocating piston 35 comprised of a body portion 37 and sealing rings 39.

Connected to piston 35 are two needle-like piercing means 41 which extend through elongated tubular orifices 43, orifices 43 communicating at one end with cylinder 31 and at the other end with cavity 15. As illustrated in FIGS. 3-4, tubular orifices 43, preferably terminate in raised portions 45 built into the mold cavity wall 17, so as to provide for countersinking 11 of holes 9. Orifices 43 are so designed such that needle means 41 easily slide therein in substantially air-tight fashion. This is best accomplished by employment of a conventional lubricant.

While any conventional technique may be employed to reciprocate piston 35 in cylinder 31, and thereby cause piercing means 41 to reciprocate inwardly and outwardly from cavity 15, it is preferred for the purposes of this invention to employ a time-controlled air-actuating means comprised of two-way air valves 47 and controlled air-actuating timer and air supply means 49. Timer and air supply means 49 may be of any conventional design well known in the art. As will be described more fully with reference to FIGS. 5A-F, this timer will be set, in accordance with conventional techniques, to actuate piston 35 during the period of time when the cannula walls are being blown against cavity walls 17 and preferably just shortly after contact is made. A particular preferred timer for the purposes of this invention is an Industrial Timer made by Industrial Timer Corp. of Parsippany, N.J. which may be connected to the conventional timing mechanism of a conventional blow-molding machine such as a Wesflex Blow-Molder with an Olympia Extruder. The timers employed in this machine are the same type of timers employed for actuating piston 35. Such a machine generally employs about a 10 second molding cycle with about 2 seconds thereof being used to close the mold and expand the parison into contact with the walls.

It should be noted at this point, that while this invention is being described with respect to a static cannula mold, since such constitutes a preferred embodiment because it overcomes a particularly unique problem in the cannula hole forming art, other devices both static and continuous may be formed in other, redesigned molds, the basic concept being set forth above relative to a reciprocating punch means. For example, piston 35 and cylinder 31, may take other forms or shapes. As shown, they are preferably horizontally actuated and located in the walls of the mold. However, if it is desired to form holes at an angle to the horizontal, such pistons, cylinders and orifices 43 may be so angled to provide the desired result.

Referring now to FIGS. 5A-F, there is disclosed a preferred operation of the device illustrated in FIGS. 3-4 so as to produce a cannula 1 as illustrated in FIGS. 1 and 2, whose holes are substantially unfrayed and thus free of any potentially contaminating plastic minutia. Referring first to FIG. 5A, in the initial stages of the operation mold halves 51A and 51B are open so as to allow a conventional extruder 53 to extrude a hot malleable hollow parison 55 into the cavity area. Such an extruder, or other tubular parison injecting means, are well known in the art and constitute no part of this invention. Likewise, the plastic employed for making the cannula may be any conventional plastic, it being preferred for the purposes of this invention to form the cannula out of poly ethylene.

In accordance with conventional timing mechanisms employed with a blow-molding machine, when parison 55 reaches a predetermined level mold halves 51A and 51B are actuated so as to come together as shown in FIG. 5B. At this point, circumferential ridge 27 pinches off the bottom of tubular parison 55, it still being in a malleable state, and, thereafter, as illustrated in FIG. 5C, air is injected preferably through the internal portion of extruder 53 so as to provide excessive pressure internally of parison 55 which causes the walls of parison 55 to expand against wall 17 of the cavity.

It is at this time that air-actuating timer means is set by conventional techniques (either sensing or just by timing) to cause piston 35 to reciprocate in cylinder 31 and cause piercing means 41 to move into cavity 15 and pierce the parison walls.

While piston 35 may be actuated just prior to the time that the walls of parison 55 contact cavity walls 17, and thus cause needle-piercing means 41 to punch holes in the walls of parison 55 while parison 55 is still expanding to the walls of cavity 17, it is preferable to so time piston 35 such that piercing means 41 only contact the walls of parison 55 after they have contacted walls 17. Since in most conventional water-cooled blow-molding cycles, it takes about 10-12 seconds for the mold to shut, the parison walls to expand, and the plastic to become rigid, and since it takes about the first 1-2 seconds to expand the plastic into full contact with cavity walls 17, timer 49 may be set to actuate piston 35 at, for example, about 1-6 seconds (6 seconds usually being the time at which the plastic will become too rigid to form a smooth, non-frayed hole) into the cycle. These times are, of course, only typical for one type of conventional device and article. They will differ, in a known way, as different cycles, machines and articles are employed.

The accomplishment of this piercing operation is illustrated in FIG. 5D. As shown by the arrows, dual air-valves 47B are on vent while valves 47A are an input. Air is injected through valves 47A driving piston 35 toward cavity 15, and thus driving piercing means 41 into hole forming engagement with the parison walls. Since the parison walls are still hot and malleable, the plastic tends to flow around piercing means 41. such flow serves two purposes. Firstly it prevents the formation of frayed holes. Secondly it seals the parison such that, if by chance, the parison was not fully expanded, loss of air would not occur to prevent such full expansion. Piercing means 41 are now allowed to reside in piercing position for a sufficient time to allow the holes to become rigid. This usually means allowing for a dwell time of about 4-6 seconds in the conventional operation as described above. Actually, by simple, routine experimentation with the blow-molding machine actually employed, dwell time can be regulated so as as to withdraw piercing means 41 at a time such that the plastic is sufficiently rigid to maintain the countersunk hole, but there still remains a small amount of flow which will take place after withdrawal such that the smoothness of the hole's circumference will be assured.

Withdrawal is illustrated in FIG. 5E. As governed by timer 49, valves 47A are moved to exhaust while valves 47B are placed on input. Air is then injected through valves 47B into cylinder 31, driving piston 35 outwardly from the cavity and thus piercing means 41 from hole forming engagement. As further illustrated in FIG. 5E, simultaneously with the withdrawal of needle piercing means 41, there is usually conducted a trimming operation which is actuated at 23 so as to cut off and trim the top portion of parison tube 55.

As illustrated in FIG. 5F, the top portion of the blow molded cannula now having been trimmed and the cannula now having had an opportunity to reside for its prescribed period of time in the cavity so as to become rigid, and the piercing means 41 having been withdrawn such that smooth countersunk holes have now been formed in the cannula, the mold halves 51A and 51B are opened and cannula 1 is allowed to be dispensed therefrom.

Many other features, modifications and improvements will become evident to the skilled artisan once given the above disclosure. Such other features, modifications and improvements are thus considered to be a part of this invention, the scope of which is to be determined by the following claims:

I claim:

1. In a mold for blow-molding a hollow plastic article comprising mold walls having located therein a cavity portion of the dimensions of the desired article, said cavity portion being defined by cavity walls which terminate at one point in an orifice in said mold walls through which a plastic parison may be inserted, the improvement comprising reciprocating punch means communicating through said mold walls with said cavity portion to an extend sufficient to form at least one hole in the wall of the hollow plastic article during the blow molding operation, and means for reciprocating said punch means, said means for reciprocating said punch means including timing means for retracting said punch means from said hole forming communication at a time when the parison is still malleable such that a smooth, substantially nonfrayed hole is formed.

2. A mold according to claim 1 wherein said reciprocating punch means comprises a cylinder, a reciprocating piston located within said cylinder and connected to piercing means which communicate with the cavity through tubular orifice means in the mold walls, said piercing means being of a sufficient size and so located in said tubular orifice means such that when said piston is reciprocated in one direction said piercing means extend sufficiently far into the cavity to form a hole in the wall of a plastic article being blow-molded therein and such that when said piston is reciprocated in the other direction said piercing means are withdrawn out of communication with said cavity.

3. A mold according to claim 2 wherein said means for reciprocating said punch means comprises air-actuated reciprocating means for reciprocating said piston in said cylinder, and timing means capable of actuating said reciprocating means such that said piercing means is caused to enter said cavity and pierce the wall of the plastic article just prior to or after the wall of the plastic article contacts the cavity wall and said piercing means is caused to retract from said cavity before the mold is opened to release the formed plastic article therefrom, and wherein said punch means is not a blow pin means.

4. A mold according to claim 3 wherein said cylinder is located in the mold walls.

5. A mold according to claim 4 wherein the walls of said cavity define a cannula for a disposable douche device.

6. A mold according to claim 5 wherein said piercing means are pointed needle means and said tubular orifice means are of a slightly larger diameter than said needle means, said tubular orifice means extending between said cavity and said cylinder.

7. A mold according to claim 6 wherein the end of said tubular orifice means communicating with said cavity terminates in an inwardly raised portion in the wall of said cavity such that the hole formed in the cannula is countersunk.

8. A mold according to claim 7 wherein the mold is of two half sections and there is one reciprocating punch means in each half section such that at least two holes are formed in said cannula.

9. A mold according to claim 8 wherein each piston has connected thereto two piercing means such that four holes are formed in said cannula.

* * * * *